(12) United States Patent
Wang et al.

(10) Patent No.: US 10,623,678 B2
(45) Date of Patent: Apr. 14, 2020

(54) DISPLAY APPARATUS ARCHITECTURE

(71) Applicants: ShenZhen Hongfei Precision Technology Co., Ltd., Shenzhen (CN); HON HAI PRECISION INDUSTRY CO., LTD., New Taipei (TW)

(72) Inventors: Wen-Pin Wang, New Taipei (TW); Li-Tang Lin, New Taipei (TW); Ming-Li Hsu, New Taipei (TW); Shih-Wei Hsiao, New Taipei (TW)

(73) Assignees: ShenZhen Hongfei Precision Technology Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/238,541

(22) Filed: Jan. 3, 2019

(65) Prior Publication Data
US 2019/0208153 A1    Jul. 4, 2019

Related U.S. Application Data

(60) Provisional application No. 62/613,064, filed on Jan. 3, 2018, provisional application No. 62/614,494, filed on Jan. 7, 2018.

(51) Int. Cl.
| | | |
|---|---|---|
| H04N 5/38 | (2006.01) | |
| G06F 3/147 | (2006.01) | |
| H04N 5/63 | (2006.01) | |
| H04N 5/44 | (2011.01) | |
| G09G 5/00 | (2006.01) | |
| H04N 5/64 | (2006.01) | |

(52) U.S. Cl.
CPC ............... *H04N 5/38* (2013.01); *G06F 3/147* (2013.01); *G09G 5/006* (2013.01); *H04N 5/44* (2013.01); *H04N 5/63* (2013.01); *H04N 5/64* (2013.01); *G09G 2370/16* (2013.01)

(58) Field of Classification Search
None
See application file for complete search history.

(56) References Cited

U.S. PATENT DOCUMENTS

2019/0074846 A1 * 3/2019 Hamzeh ............... H04L 12/2885

* cited by examiner

*Primary Examiner* — Samira Monshi
(74) *Attorney, Agent, or Firm* — ScienBiziP, P.C.

(57) ABSTRACT

A display apparatus has a control device, a transmission device, a connection device, and a panel device. The control device receives a first data signal having a first signal type, and converts the first data signal to a second data signal having a second signal type different from the first signal type. The transmission device receives the second data signal, and converts the second data signal to a third data signal having a third signal type identical to the first signal type. The connection device removably coupled to the control device and the transmission device transmits the second data signal from the control device to the transmission device. The panel device removably coupled to the transmission device wirelessly receives the third data signal from the transmission device.

17 Claims, 4 Drawing Sheets

DISPLAY APPARATUS ARCHITECTURE

CROSS-REFERENCE TO RELATED APPLICATION(S)

The present application claims the benefit of and priority to a provisional U.S. Patent Application Ser. No. 62/613,064 filed on Jan. 3, 2018 (hereinafter referred to as "064 application") and a provisional U.S. Patent Application Ser. No. 62/614,494 filed on Jan. 7, 2018 (hereinafter referred to as "494 application"). The disclosures of the 064 and 494 applications are hereby incorporated fully by reference into the present application.

FIELD

The present disclosure generally relates to a display apparatus including a control device, and a panel device separated from the control device.

BACKGROUND

When a control box of a TV receives an image signal or a video signal, the control box will transmit the image signal or the video signal to a TV panel via electrical cables for displaying an image or a video. However, significant signal degradation occurs, when the length of the electrical cables between the TV control box and the TV panel is greater than 30-50 centimeters. Thus, the control box must be installed to be very close to the panel, when the control box is externally connected to the panel. Otherwise, the control box must be integrated on the back cover of the panel.

When users want to mount the TV panel having the external control box on the wall, the users may be required to prepare a wall mount plate for the panel and a shelf for the control box to be installed near the TV panel. Thus, it is not convenient for the users to mount the TV on the wall.

In addition, the thickness of the TV is equal to the sum of the thickness of the control box and the thickness of the panel, if the control box is integrated on the back cover of the TV panel. Thus, the panel integrated with the control box will have excessive thickness.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
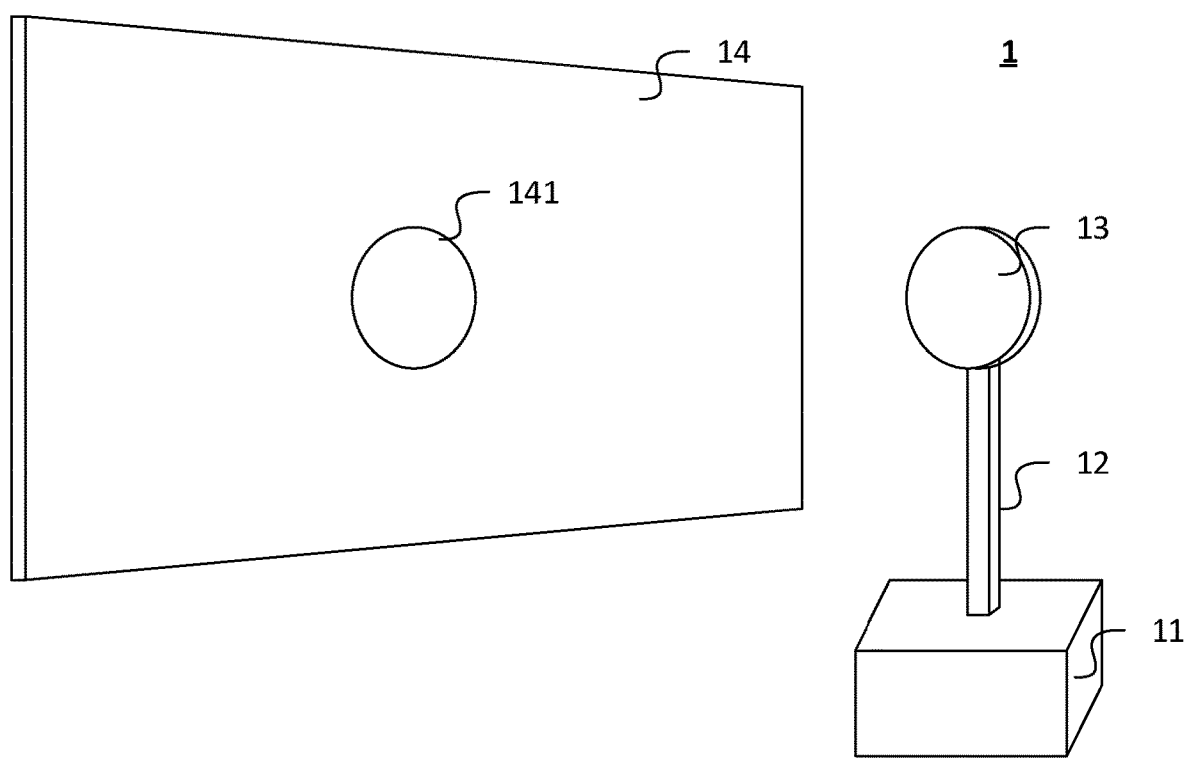
FIG. 1 is a schematic illustration of one exemplary implementation of a display apparatus.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

FIG. 1 is a schematic illustration of one exemplary implementation of a display apparatus. In the implementation, the display apparatus 1 may include a control device 11, a connection device 12, a transmission device 13, and a panel device 14. The panel device 14 is coupled to the control device 11 via the transmission device 13 and the connection device 12.

In at least one implementation, the control device 11 may be put on a table, a shelf, or a rack being far from or near the panel device 14. The control device 11 receives an external signal from an external content source (not shown), and generates a content signal based on the external signal. In addition, the control device 11 may be coupled to an external power supply (not shown), and supply power to the transmission device 13 and the panel device 14 through the connection device 12. In at least one implementation, the content signal may be a video signal, an image signal, an audio signal, or any other information signals.

In at least one implementation, the connection device 12 may be removably coupled to the control device 11. The connection device 12 may receive the content signal from the control device 11, and provide the content signal to the transmission device 13.

In at least one implementation, the transmission device 13 may be mounted on a wall, a floor, a ceiling, or any other surfaces being far from or near the control device 11. The transmission device 13 is removably coupled to the control device 11 through the connection device 12. The transmission device 13 receives the content signal from the control device 11 through the connection device 12. In addition, the transmission device 13 may wirelessly transmit the content signal to the panel device 14, when the control device 11 supplies power to the transmission device 13 through the connection device 12. In at least one implementation, the connection device 12 may be tucked in the wall, the floor, the ceiling, or any other surfaces, or mounted on the wall, the floor, the ceiling, or any other surface for connecting the control device with the transmission device 13 mounted on the wall, the floor, the ceiling, or any other surfaces.

In at least one implementation, the panel device 14 includes a receipt device 141. The panel device 14 is removably coupled to the transmission device 13 via the receipt device 141. When the panel device 14 is attached on the transmission device 13 via the receipt device 141, the control device 11 may supply power to the panel device 14 through the connection device 12, and the transmission device 13. In the implementation, the receipt device 141 of the panel device 14 may wirelessly receive the content signal from the transmission device 13. In the implementation, an external surface of the receipt device 141 may be exposed from the panel device 14 for connecting to the transmission device 13, when the receipt device 141 is integrated into the panel device 14.

In at least one implementation, the display apparatus 1 may be a screen, a monitor, a television, or other display device. FIG. 1 illustrates only one exemplary implementation of the display apparatus 1, and the display apparatus 1, in other implementations, may include more or less components than as illustrated, or have a different configuration of the various components.

Figure 2:
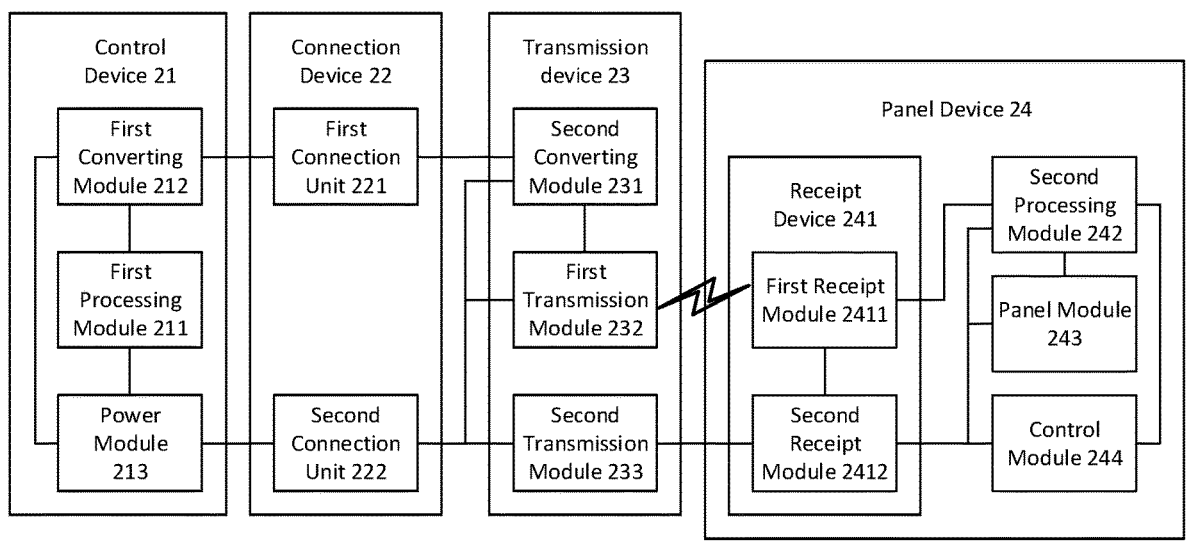
FIG. 2 is a block diagram of an exemplary implementation of the display apparatus of FIG. 1.

FIG. 2 is a block diagram of an exemplary implementation of the display apparatus FIG. 1. In the implementation, the display apparatus 2 may include a control device 21, a connection device 22, a transmission device 23, and a panel device 24. The panel device 24 is coupled to the control device 21 via the transmission device 23 and the connection device 22.

In at least one implementation, the control device 21 includes a first processing module 211, a first converting module 212, and a power module 213. The power module 213 is coupled to the first processing module 211, the first converting module 212, and an external power supply (not shown). The first processing module 211 is further coupled to the first converting module 212, and an external content source (not shown). When the power module 213 supplies power to the first processing module 211 and the first converting module 212, the first processing module 211 may receive an external signal from the external content source and generate a content signal based on the external signal. In at least one implementation, the content signal generated by the first processing module 211 may be a first data signal. In at least one implementation, the first converting module 212 may receive the first data signal from the first processing module 211. In at least one implementation, the first data signal has a first signal type. In one implementation, the first signal type is an electrical type, and the first data signal is a first electrical signal.

In at least one implementation, the first processing module 211 may be a processor, a central processing unit (CPU), a graphic processing unit (GPU), a system on chip (SoC), a field-programmable gate array (FPGA), or a controller for executing the program instruction in a storage device (not shown). The first processing module 211 may further include an embedded system or an application specific integrated circuit (ASIC) having embedded program instructions.

In at least one implementation, the first converting module 212 may be an electrical-to-optical conversion module. The first converting module 212 may include a light source (not shown), and the light source may provide an optical light for generating a second data signal based on the first data signal received from the first processing module 211. In at least one implementation, the first converting module 212 may include a light driver (not shown), and the light driver may drive the light source to generate the second data signal through the optical light based on the first data signal. In at least one implementation, the second data signal has a second signal type different from the first signal type. In one implementation, the second signal type is an optical type, and the second data signal is an optical signal. In at least one implementation, the content signal transmitted from the first converting module 212 may be the second data signal. In at least one implementation, the second signal type may be any other signal types. In at least one implementation, a first degradation rate of the first data signal transmitted in a first transmitting line is much greater than a second signal degradation of the second data signal transmitted in a second transmitting line. In the implementation, the first transmitting line is an electrical cable and the second transmitting line is an optical fiber, when the first data signal is the electrical signal and the second data signal is the optical signal.

In at least one implementation, the power module 213 may include at least one power supply unit. Each of the at least one power supply unit may provide an output voltage for at least one of the first processing module 211, the first converting module 212, and the connection device 22. Each of the first processing module 211 and the first converting module 212 receives a corresponding voltage selected from the at least one output voltage of the at least one power supply unit.

In at least one implementation, the connection device 22 includes a first connection unit 221, and a second connection unit 222. The first connection unit 221 is removably coupled to the first converting module 212, and the second connection unit 222 is removably coupled to the power module 213.

In at least one implementation, the first connection unit 221 may by an optical connection unit having a plurality of optical fibers. The optical fibers may receive the second data signal from the first converting module 212 to transmit the second data signal to the transmission device 23. In the implementation, the second signal degradation of the second data signal may be low, since the second data signal is the optical signal transmitted in the optical fibers. Thus, a signal degradation may be too low to decrease a signal integrity of the second data signal, even if a length of the connection device 22 is greater than a line threshold of the first transmitting line, such as 30-50 centimeters of the electrical cable. The second connection unit 222 may be a power connection unit having a plurality of power cables. The power cables may receive the at least one output voltage from the power module 213 for supplying power to the transmission device 23 and the panel device 24.

In at least one implementation, the transmission device 23 includes a second converting module 231, a first transmission module 232, and a second transmission module 233. The second converting module 231 is removably coupled to the first connection unit 221 to receive the second data signal. The second converting module 231 is further coupled to the first transmission module 232. The second converting module 231, the first transmission module 232, and the second transmission module 233 are removably coupled to the second connection unit 222 to receive the at least one output voltage from the power module 213.

In at least one implementation, the second converting module 231 may be an optical-to-electrical conversion module. The second converting module 231 may include a light detector (not shown), and the light detector may receive the second data signal from the first converting module 212 through the first connection unit 221 and convert the second data signal to a third data signal. In at least one implementation, the second converting module 231 may include an amplifier (not shown), so the amplifier may amplify the third data signal. In at least one implementation, the third data signal has a third signal type different from the third signal type. In one implementation, the third signal type is the electrical type, and the third data signal is a second electrical signal. In one implementation, the third data signal may be identical to or different from the first data signal. In at least one implementation, the content signal transmitted from the second converting module 231 may be the third data signal.

In at least one implementation, the first transmission module 232 may be a wireless communication module. The first transmission module 232 may wirelessly transmit the third dada signal to the panel device 24. In at least one implementation, the first transmission module 232 may be a non-contact signal communication module to wirelessly transmit the third data signal. In the implementation, the non-contact signal communication module may be an extremely high frequency (EHF) communication module.

In at least one implementation, the second transmission module 233 may include a plurality of power transmission pins. When each of the power transmission pins is in contact with a corresponding power receipt pin on the panel device 24, the power module 213 may supply power to the panel device 24 through the second connection unit 222 and the second transmission module 233. In at least one implementation, each of the power transmission pins in the second transmission module 233 may be a pogo pin.

In at least one implementation, the second converting module 231 may convert the second data signal back to the first data signal and the first transmission module 232 may wirelessly transmit the first data signal to the panel device 24, when the power module 213 supplies power to the second converting module 231 and the first transmission module 232. In at least one implementation, the second converting module 231 may convert the second data signal to the third data signal and the first transmission module 232 may wirelessly transmit the third data signal to the panel device 24, when the power module 213 supplies power to the second converting module 231 and the first transmission module 232.

In at least one implementation, the panel device 24 includes a receipt device 241, a second processing module 242, a panel module 243, and a control module 244. In at least one implementation, the receipt device 241 further includes a first receipt module 2411 and a second receipt module 2412. The first receipt module 2411 is wirelessly and removably coupled to the first transmission module 232 to wirelessly receive the third data signal, and the second receipt module 2412 is removably coupled to the second transmission 2412 to receive the at least one output voltage. In at least one implementation, the second receipt module 2412 is coupled to the first receipt module 2411, the second processing module 242, the panel module 243, and the control module 244 to provide the at least one output voltage from the power module 213. In at least one implementation, the second processing module 242 is coupled to the first receipt module 2411 to receive the third data signal, and coupled to the panel module 243 and the control module 244 for showing a content based on the third data signal. In at least one implementation, the content may include a video, an image, a voice and any other information.

In at least one implementation, the first receipt module 2411 may wirelessly receive the third data signal from the first transmission module 232, when the power module 213 supplies power to the panel device 24 via the second connection unit 222 and the second transmission module 233. In addition, the second processing module 242 may receive the third data signal from the first receipt module 2411 to control the panel module 243 and the control module 244 to show the content.

In at least one implementation, the first receipt module 2411 may be the wireless communication module. The first receipt module 2411 may wirelessly receive the third data signal from the first transmission module 232. In at least one implementation, the first receipt module 2411 may be the non-contact signal communication module to wirelessly receive the third data signal. In the implementation, the non-contact signal communication module may be an EHF communication module.

In at least one implementation, the second receipt module 2412 may include a plurality of power receipt pins. When each of the power receipt pins is in contact with a corresponding power transmission pin on the transmission device 23, the power module 213 may supply power to the panel device 24 through the second connection unit 222 and the second transmission module 233. In at least one implementation, each of the power receipt pins of the second receipt module 2412 may be a pogo pin.

In at least one implementation, the second processing module 242 may be a processor, a central processing unit (CPU), a graphic processing unit (GPU), a system on chip (SoC), a field-programmable gate array (FPGA), or a controller for executing the program instruction in a storage device (not shown). The second processing module 242 may further include an embedded system or an application specific integrated circuit (ASIC) having embedded program instructions.

In at least one implementation, the panel module 243 may be a panel device for showing the content, and the control module 244 may be a backlight device for the panel module 243. When the second processing module 242 receives the third data signal, the second processing module 242 may control the control module 244 to provide the backlight and control the panel module 243 to show the content through the backlight provided by the control module 244.

In at least one implementation, the data signal transmitted via the connection unit 221 may be an electrical signal, when the first connection unit 221 is an electrical wire. In one implementation, the electrical wire may be a copper wire. Thus, the first converting module 212 and the second converting module 231 may be removed from the control device 21 and the transmission device 23, since it is unnecessary for the first connection unit 221 to convert the electrical signal to the optical signal and covert the optical signal back to the electrical signal.

Figure 3:
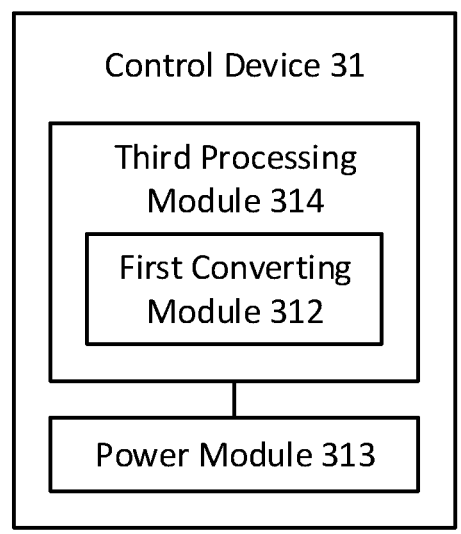
FIG. 3 is a block diagram of an exemplary implementation of the control device in the display apparatus of FIG. 1.

FIG. 3 is a block diagram of an exemplary implementation of the control device in the display apparatus of FIG. 1. FIG. 3 illustrates an exemplary implementation of a control device 31 that may be substituted for the control device 21 in the display apparatus 2 of FIG. 2. In the implementation, the control device 31 includes a first converting module 312, a power module 313, and a third processing module 314. The first converting module 312 is integrated in the third processing module 314. The power module 313 is coupled to the third processing module 314, and an external power supply (not shown). The third processing module 314 is further coupled to an external content source (not shown). When the power module 313 supplies power to the third processing module 314, the third processing module 314 may receive an external signal from the external content source, and generate a first data signal based on the external signal. In at least one implementation, the first converting module 312 of the third processing module 314 may convert the first data signal into a second data signal. In at least one implementation, the first data signal may be a first electrical signal, and the second data signal may be an optical signal.

In at least one implementation, the power module 313 may include at least one power supply unit. Each of the at least one power supply unit may provide an output voltage for at least one of the third processing module 314, and the connection device 22. The third processing module 314 receives at least one corresponding voltage selected from the at least one output voltage of the at least one power supply unit.

In at least one implementation, the third processing module 314 may be a processor, a central processing unit (CPU), a graphic processing unit (GPU), a system on chip (SoC), a field-programmable gate array (FPGA), or a controller for executing the program instruction in a storage device (not shown). The third processing module 314 may further include an embedded system or an application specific integrated circuit (ASIC) having embedded program instructions.

In at least one implementation, the first converting module 312 of the third processing module 314 may be an electrical-to-optical conversion module. The first converting module 314 may include a light source (not shown) and a light driver (not shown), and the light driver may drive the light source to generate an optical light for generating the second data signal based on the first data signal generated by the third processing module 314. In at least implementation, the first converting module 312 of the third processing module 314 may be coupled to the first connection unit 221 in FIG. 2 for transmitting the second data signal to the second converting module 231 of the transmission device 23.

Figure 4A:
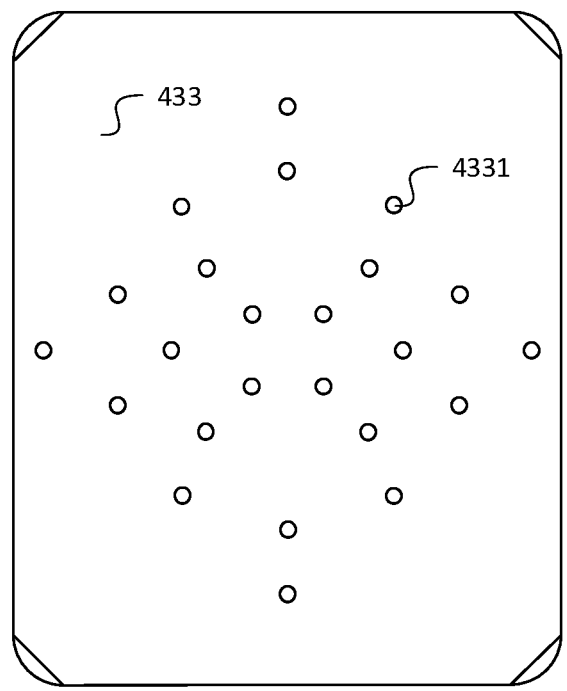
FIG. 4A and FIG. 4B are schematic illustrations of exemplary implementations of the second transmission module and the second receipt module in the display apparatus of FIG. 2.
Figure 4B:
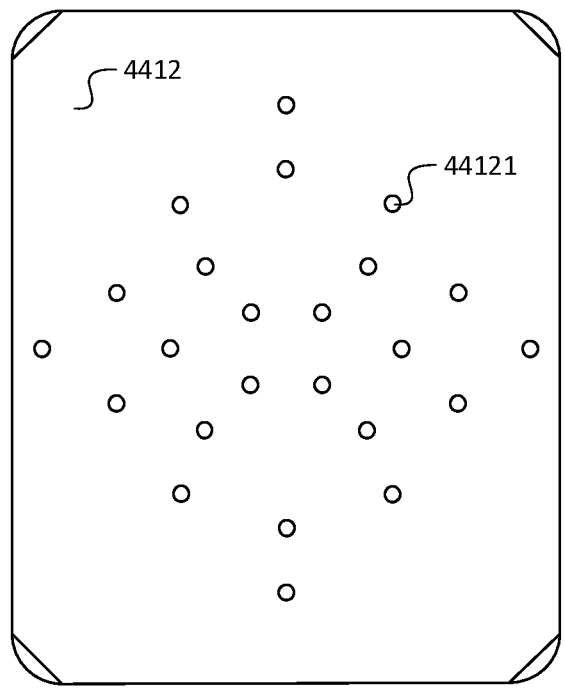

FIG. 4A and FIG. 4B are schematic illustrations of one exemplary implementation of the second transmission module 233 and the second receipt module 2412 in the display apparatus 2 of FIG. 2. A second transmission module 433 may include a plurality of power transmission pins 4331, and a second receipt module 4412 may include a plurality of power receipt pins 44121. Each of the power transmission pins 4331 is disposed on a first surface of the second transmission module 433, and each of the power receipt pins 44121 is disposed on a second surface of the second receipt module 4412. In the implementation, each of the power receipt pins 44121 is removably in contact with one of the power transmission pins 4331.

In at least one implementation, the panel device 24 may show a content, when the power module 213 may supply power to the panel device 24 through the second transmission module 433 and the second receipt module 4412. Thus, the first surface of the second transmission module 433 may be in contact with the second surface of the second receipt module 4412, and then each of the power transmission pins 4331 may be in contact with a corresponding one of the power receipt pins 44121.

In at least one implementation, the power transmission pins 4331 and the power receipt pins 44121 may be a plurality of pogo pins respectively protruded from the first surface and the second surface. Thus, the power transmission pins 4331 may be in contact with the power receipt pins 44121, before the first surface is in contact with the second surface. In the implementation, the power transmission pins 4331 may be in contact with the power receipt pins 44121, even if the first surface is not in contact with the second surface.

In at least one implementation, the power module 213 may provide a plurality of output voltages for different voltage needs of components in the display device 2. Thus, the power transmission pins 4331 of the second transmission module 233 may provide the different output voltages received from the power module 213 for the panel device 24.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A display apparatus, comprising:
a control device generating a first data signal having a first signal type and converting the first data signal to a second data signal having a second signal type different from the first signal type;
a transmission device receiving the second data signal, converting the second data signal to a third data signal having a third signal type identical to the first signal type, and comprising:
  a first transmission module coupled to the control device, and wirelessly transmitting the third data signal; and
  a second transmission module coupled to the control device, and supplying power to the first transmission module;
a connection device removably coupled to the control device and the transmission device for transmitting the second data signal from the control device to the transmission device; and
a panel device removably coupled to the transmission device wirelessly receiving the third data signal from the transmission device, and comprising:

a first receipt module wirelessly coupled to the first transmission module; and
a second receipt module removably coupled to the second transmission module, wherein the first receipt module wirelessly receives the first data signal from the first transmission module when the control module supplies power to the first receipt module via the connection device, the second transmission module, and the second receipt module.

2. The display apparatus of claim 1, wherein the control device comprises:
a power module removably coupled to the panel device via the connection device and the transmission device for supplying power to the transmission device, and the panel device.

3. The display apparatus of claim 2, wherein
the control device comprises:
a first processing module receiving an external signal and generating the first data signal based on the external signal; and
a first converting module coupled to the first processing module and converting the first data signal to the second data signal; and
the connection device comprises:
a first connection unit removably coupled to the first converting module and transmitting the second data signal to the transmission device; and
a second connection unit removably coupled to the power module and the transmission device for supplying power to the transmission device, and the panel device.

4. The display apparatus of claim 3, wherein the first signal type and the third signal type are electrical signals, the second signal type is an optical signal, and the first connection unit is an optical fiber.

5. The display apparatus of claim 2, wherein the transmission device comprises:
a second converting module coupled to control device via the connection device, coupled to the first transmission module, receiving the second data signal via the connection device, and converting the second data signal into the third data signal.

6. The display apparatus of claim 5, wherein a non-contact signal communication between the first receipt module and the first transmission module is driven to transmit the third data signal from the first transmission module to the first receipt module, when the second transmission module is in contact to the second receipt module for supplying power to the first receipt module.

7. The display apparatus of claim 6, wherein the non-contact signal communication is extremely high frequency (EHF) communication.

8. A display apparatus, comprising:
a control device generating a first data signal and converting the first data signal to a second data signal different from the first data signal;
a transmission device removably coupled to the control device via a connection device, converting the second data signal received from the control device via the connection device back to the first data signal, and comprising:
a first transmission module coupled to the control device, and wirelessly transmitting the first data signal; and
a second transmission module coupled to the control device, and supplying power to the first transmission module; and
a panel device removably coupled to the transmission device, wirelessly receiving the first data signal from the transmission device, and comprising:
a first receipt module wirelessly coupled to the first transmission module; and
a second receipt module removably coupled to the second transmission module, wherein the first receipt module wirelessly receives the first data signal from the first transmission module when the control module supplies power to the first receipt module via the second transmission module, and the second receipt module.

9. The display apparatus of claim 8, wherein the first data signal is an electrical signal, and the second data signal is an optical signal.

10. The display apparatus of claim 9, wherein the connection device comprises:
an optical connection unit removably coupled to the control device and the transmission device and transmitting the optical signal from the control device to the transmission device; and
a power connection unit removably coupled to the control device and the transmission device, wherein the control device supplies power to the transmission device and the panel device via the power connection unit.

11. The display apparatus of claim 8, wherein the transmission device comprises:
a second converting module coupled to the control device via the connection device, coupled to the first transmission module, receiving the second data signal via the connection device, and converting the second data signal back to the first data signal.

12. The display apparatus of claim 11, wherein a non-contact signal communication between the first receipt module and the first transmission module is driven to transmit the first data signal from the transmission device to the panel device, when the second transmission module is in contact to the second receipt module to supply power to the first receipt module.

13. The display apparatus of claim 12, wherein the non-contact signal communication is extremely high frequency (EHF) communication.

14. A display apparatus, comprising:
a control device generating a data signal;
a transmission device removably coupled to the control device to receive the data signal, wirelessly transmitting the data signal, and comprising:
a first transmission module coupled to the control device, and wirelessly transmitting the data signal; and
a second transmission module coupled to the control device, and supplying power to the first transmission module; and
a panel device removably coupled to the transmission device, wirelessly receiving the data signal from the transmission device, and comprising:
a first receipt module wirelessly coupled to the first transmission module; and
a second receipt module removably coupled to the second transmission module, wherein the first receipt module wirelessly receives the data signal from the first transmission module, when the control module supplies power to the first receipt module via the second transmission module, and the second receipt module.

15. The display apparatus of claim 14, wherein a connection device removably coupled between the control device and the transmission device comprises:
- a first connection unit removably coupled to the control device and the transmission device and transmitting the data signal from the control device to the transmission device; and
- a second connection unit removably coupled to the control device and the transmission device, wherein the control device supplies power to the transmission device and the panel device via the second connection unit.

16. The display apparatus of claim 14, wherein a non-contact signal communication between the first receipt module and the first transmission module is driven to transmit the first data signal from the transmission device to the panel device, when the second transmission module is in contact to the second receipt module to supply power to the first receipt module.

17. The display apparatus of claim 16, wherein the non-contact signal communication is extremely high frequency (EHF) communication.

* * * * *